(12) United States Patent
Griffin

(10) Patent No.: US 9,262,778 B2  
(45) Date of Patent: Feb. 16, 2016

(54) METHODS AND SYSTEMS FOR STOREFRONT GENERATION

(75) Inventor: Kent Griffin, Mountain View, CA (US)

(73) Assignee: EBAY INC., San Jose, CA (US)

(*) Notice: Subject to any disclaimer, the term of this patent is extended or adjusted under 35 U.S.C. 154(b) by 491 days.

(21) Appl. No.: 13/081,211

(22) Filed: Apr. 6, 2011

(65) Prior Publication Data

US 2012/0260199 A1  Oct. 11, 2012

(51) Int. Cl.
G06Q 30/00 (2012.01)
G06Q 30/06 (2012.01)
G06Q 10/08 (2012.01)

(52) U.S. Cl.
CPC .......... *G06Q 30/0601* (2013.01); *G06Q 10/087* (2013.01)

(58) Field of Classification Search
CPC .......................................... G06Q 30/06–30/08
USPC ................................................. 705/26.1–27.2
See application file for complete search history.

(56) References Cited

U.S. PATENT DOCUMENTS 6,263,352 B1 * 7/2001 Cohen ........................... 715/206
8,291,408 B1 * 10/2012 Czymontek ................... 717/178
2001/0049672 A1 12/2001 Moore et al.
2011/0078678 A1 * 3/2011 Matthews ..................... 717/178

FOREIGN PATENT DOCUMENTS

WO  WO-2012138490 A1  10/2012

OTHER PUBLICATIONS

BHPhotoVideo (Jan. 15, 2006, selected pages, 2 pages, http://web.archive.org/liveweb/http://www.bhphotovideo.com/bnh/controller/home;jsessionid=DySSxwP7n4!211993408?O=RootPage.jsp&A=getpage&Q=holidayschedule.jsp).*
"International Application Serial No. PCT/US2012/030374, International Preliminary Report on Patentability mailed Oct. 17, 2013", 6 pgs.
"International Application Serial No. PCT/US2012/030374, International Search Report mailed Jun. 22, 2012", 3 pgs.
"International Application Serial No. PCT/US2012/030374, Written Opinion mailed Jun. 22, 2012", 4 pgs.

* cited by examiner

*Primary Examiner* — Ethan D Civan
(74) *Attorney, Agent, or Firm* — Maschoff Brennan

(57) ABSTRACT

A method and a system to generate mobile storefronts are described. The storefront application is executable by a user device to allow a user of the user device to access the storefront and purchase an item from a merchant. The system comprises an initialization module that provides an initialization interface to an identified merchant that is used to initialize creation of a storefront application. A storefront module provides a generation interface that receives, from the merchant, an appearance for the storefront application. An inventory module receives an inventory information describing items for sale. A policy module provides a policy interface that receives policies of the storefront. A platform module generates source code that when compiled, becomes the storefront application. The source code is generated based at least on one or more templates and the inventory.

20 Claims, 10 Drawing Sheets

FIG. 4

Step 1 of 2: Modify your Storefront

Enter all the details of your storefront on this step, including store title & logo, products you want in the store, extra details like policies and shipping info and customization of your stores appearance.

Proceed to Step 2 – Publish ▲

| Store Settings | Products | Appearance | Policies | Shipping |

Preview your widget: 502

[Mobile preview showing:]
1:38 PM 87%
Build your own store >>
Logo | Your Storefront Title Goes Here Long Name Lorem
Product Image Goes Here
Product Title Goes Here...
$10.95 USD
Swipe left or right to move through products
●○○○○○○○○○
Shopfront  Products  Shopping Cart  About Choose preview [iPhone/iOS devices ▼]

Choose a theme:

Product Title $10.95 USD

Circus Maximo | Theme Name | Theme Name | Theme N

Or customize the appearance & colors:

Main Background Color        #FFFFFF
Accent/Complementary Color   #FFFFFF
Text Color                   #FFFFFF Background Image             [Browse]

[SAVE SETTINGS]

Step 1 of 2: Modify your Storefront

Enter all the details of your storefront on this step, including store title & logo, products you want in the store, extra details like policies and shipping info and customization of your stores appearance.

Preview your widget: 602

| Store Settings | Products | Appearance | Policies | Shipping |

Products in your Store                                    + NEW PRODUCT

- Product Title Goes Here    $45.99 USD    QTY: 15    ✎ ☆ ✕
- Product Title Goes Here    $7.99 USD     QTY: 10    ✎ ☆ ✕
- Product Title Goes Here    $9.99 USD     QTY: 8     ✎ ☆ ✕
- Product Title Goes Here    $14.99 USD    QTY: 50    ✎ ☆ ✕

Product Settings

*Home screen product:*
● Show featured product
○ Rotate all products

*When a product inventory is empty (0):*
● Show product as "Sold Out"
○ Hide product until inventory is restocked

[SAVE SETTINGS]

604

Preview (iPhone mockup):
1:38 PM  87%
Logo  Your Storefront Title Goes Here Long Name Lorem
Products
- Product Title Goes Here...  $10.95 USD
- Product Title Goes Here...  $10.95 USD
- Product Title Goes Here...  $10.95 USD
- Product Title Goes Here...  $10.95 USD Shopfront | Products | Shopping Cart | About Choose preview [iPhone/iOS devices ▼]

[Proceed to Step 2 – Publish ▲]

Step 2 of 2: Publish your Storefront

Choose the format in which you are publishing your storefront using the checkboxes below. For HTML widgets, you will need to copy and paste the code to your chosen website/other.

◀ Return to Step 1 – Modify your Storefront

Select which platforms you would like to publish your store:

☐ IPhone/IOS Devices
☐ Android
☐ HTML

[ PUBLISH ]

If HTML chosen, copy and paste the code from below:

```
<object classid="clsid:D27CDB6E-AE6D-11cf96BB-444553540000"
codebase="http://download.macromedia.com/pub/shockwave/cabs/flas
h/swflash.cab#version=7,0,19,0" width="215" height="355"><param
name="movie"
value="http://storefront.paypallabs.com/store/portablestore.swf?store_i
d=570090e08651012diffe2000d60d4b7b8"/><param name="quality"
value="high" /><param name="FlashVars"
value="store_id=570090e08651012diffe2000d60d4b7b8"><param
name="allowNetworking" value="all" /><embed
name="allowScriptAccess="always" allowNetworking="all"
allowScriptAccess="always" value="all" /><embed
src="http://storefront.paypallabs.com/store/portablestore.swf?store_id=
```

METHODS AND SYSTEMS FOR STOREFRONT GENERATION

TECHNICAL FIELD

The present application relates generally to the technical field of data processing and, in one specific example, to generating a storefront.

BACKGROUND

Online merchants provide online stores where the merchants sell their goods to consumers. A merchant may set up a storefront accessible via a website or via an application. To provide an application, the merchant may have to hire a programmer or code the application himself.

BRIEF DESCRIPTION OF THE DRAWINGS

Some embodiments are illustrated by way of example and not limitation in the figures of the accompanying drawings in which:

FIG. 4 is an example interface for initiating generation of a mobile storefront according to an example embodiment.

FIG. 5 is an example interface for selecting the appearance of a mobile storefront according to an example embodiment.

FIG. 6 is an example interface for providing products to a mobile storefront according to an example embodiment.

FIG. 7 is an example interface for adding a product to a mobile storefront according to an example embodiment.

FIG. 9 is an example interface for publishing a mobile storefront according to an example embodiment.

DETAILED DESCRIPTION

Example methods and systems to generate a mobile storefront are described. In the following description, for purposes of explanation, numerous specific details are set forth in order to provide a thorough understanding of example embodiments. It will be evident, however, to one skilled in the art that the present invention may be practiced without these specific details.

Online merchants publish a mobile storefront where buyers can browse items for sale and purchase those items using a mobile device. The mobile device may be a smartphone, tablet, or other connected user devices such as a television set or set-top box. The systems and methods provided herein allow a merchant to generate a mobile storefront that can be downloaded by the user of the mobile device. In various embodiments, the merchant is automatically provided source code to modify, add-to, or publish directly to the users.

Figure 1:
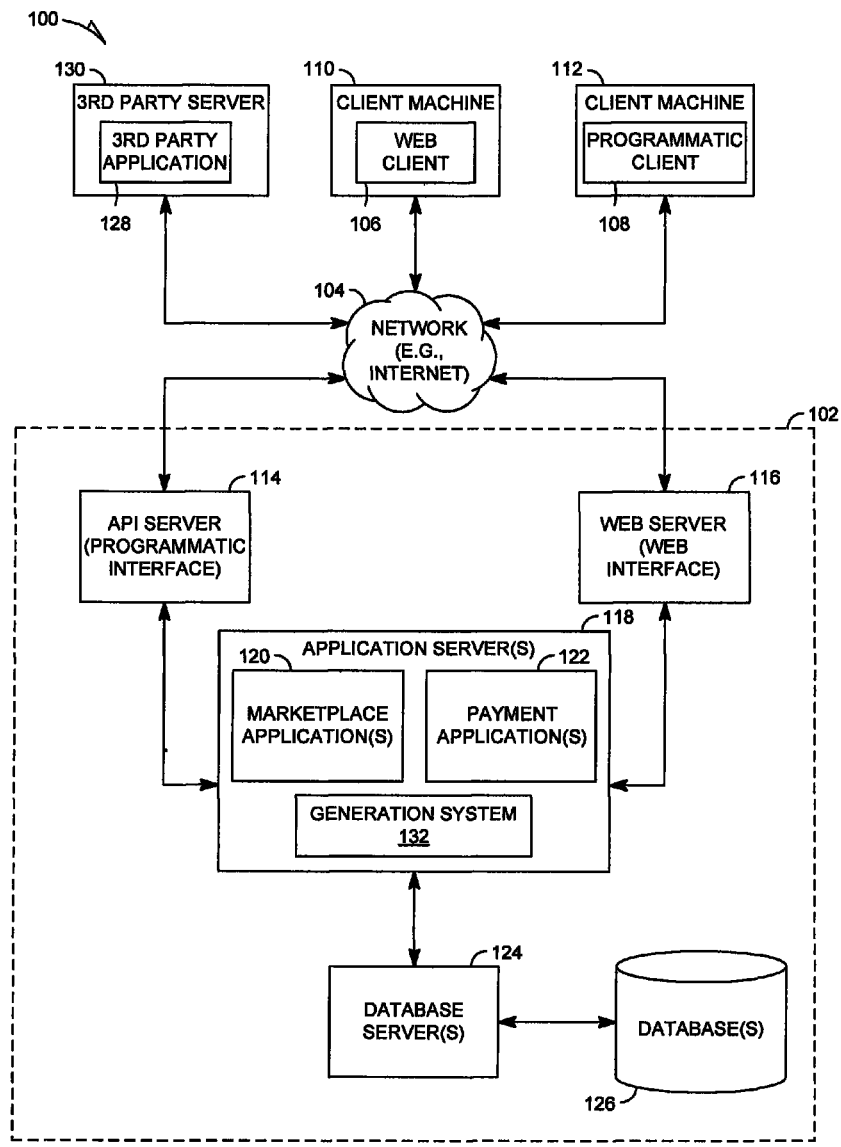
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126. The application servers 118 may further host a generation system 132 that generates mobile storefronts.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and may equally find application in a distributed, or peer-to-peer, architecture system, for example. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
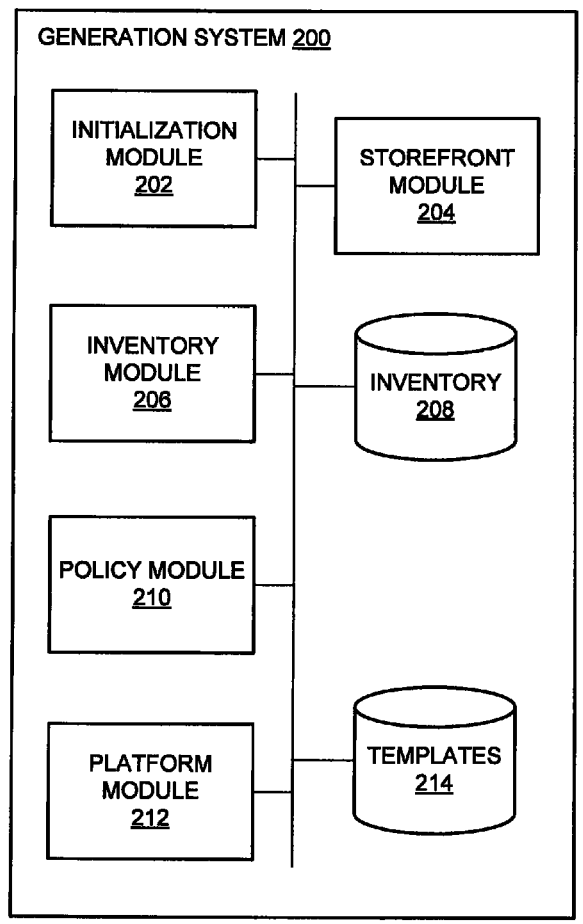
FIG. 2 is a block diagram of an example generation system according to various embodiments.

FIG. 2 is a block diagram of an example generation system 200 according to various embodiments. The generation system 200 may be an example of generation system 132. The example generation system 200 may be implemented in hardware, software, or using a combination of hardware and software. In some instances, the generation system 200 may be implemented using one or more processors. The generation system 200 comprises a plurality of modules implemented in hardware, software, or a combination thereof. The modules may, respectively, use or have one or more processors. The generation system 200 may be accessible via a website as shown herein. In other embodiments, the generation system 200 may be accessible via, for example, a mobile application, a widget, or a computer application.

An initialization module 202 is configured to identify a merchant from among a plurality of merchants for whom to generate a storefront. The merchant may be identified using information provided by the merchant such as a login name, a token, a password, or the like. The merchant may, alternatively, be identified using other information such as a cookie, a device identifier, an IP address, or the like.

Figure 4:
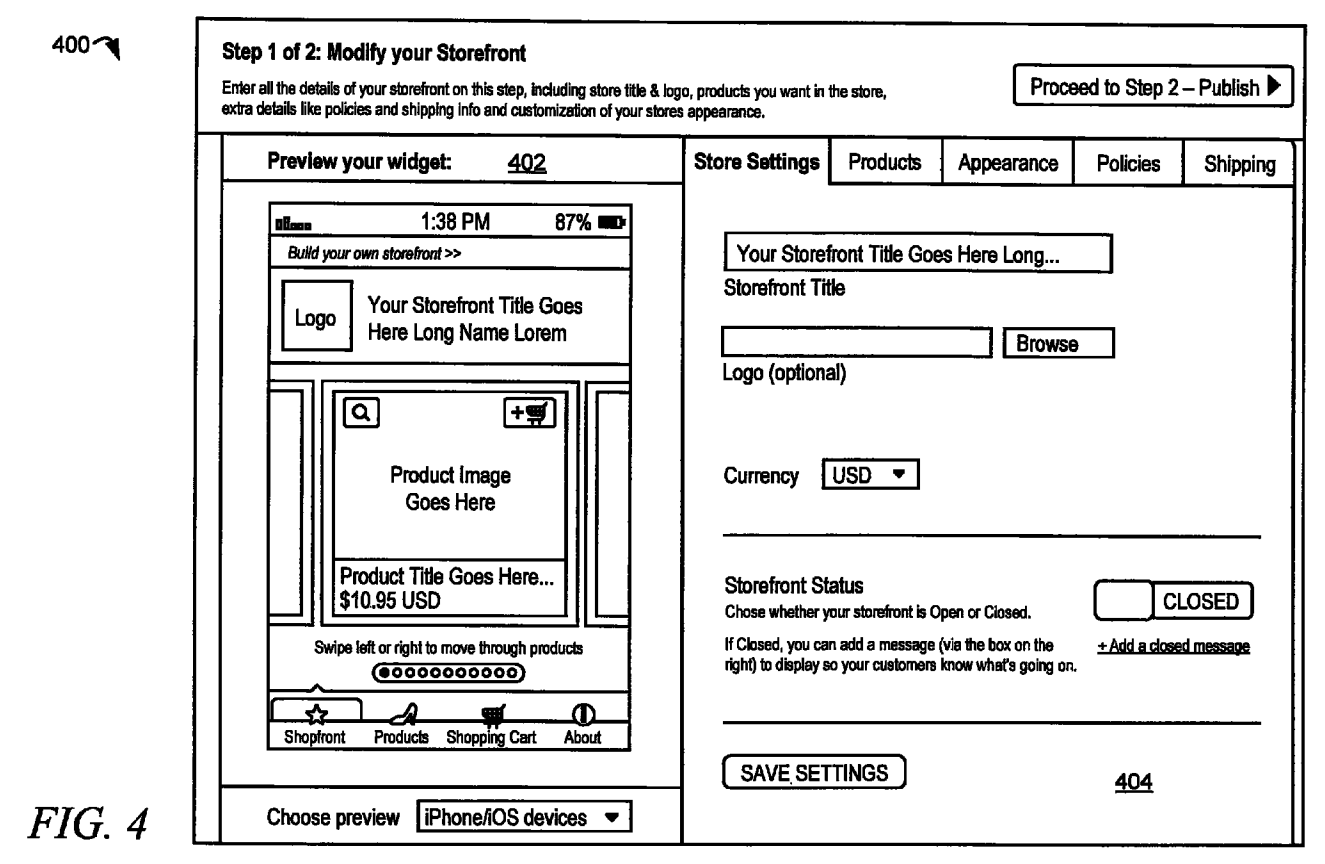

The initialization module 202 may further allow a merchant to establish one or more storefronts. The merchant may provide, via a user interface, a title to identify the storefront, a logo for the storefront, a currency accepted by the storefront, and a storefront status (e.g., open or closed). One example of an interface provided by the initialization module 202 is depicted in FIG. 4. The initialization module 202 may receive further information about the storefront such as, for example, seasonality, contact information, shipping location, acceptance of terms and conditions, reputation information of the merchant, billing information used to bill the merchant for the storefront, and the like.

A storefront module 204 is configured to allow the merchant to specify an appearance of the storefront via a generation interface provided by the storefront module 204. An example of a generation interface is depicted in FIG. 5. The storefront module 204 may receive a selection of a graphical theme for the storefront from a plurality of graphical themes. In some instances, the merchant may upload a graphical theme to the storefront module 204. A graphical theme specifies a layout of objects within an interface provided by the storefront to users. The objects may include a storefront title or logo, images of products for sale, product titles, product descriptions, menu layout, elements selectable by the user to perform various actions, and the like. In some instances, the merchant may customize a selected theme by, for example, changing fonts, changing text style or font size, changing pattern or texture, changing a background image, or the like. In some instances, the merchant may upload objects such as logos, images, or product descriptions via the generation interface.

An inventory module 206 is configured to receive and manage an inventory from the merchant that describes products for sale by the merchant. Examples of interfaces generated by the inventory module 206 are depicted in FIG. 6 and in FIG. 7. The inventory may be stored in an inventory database 208 for access by potential buyers and the merchant. In one embodiment, the inventory may be accessed by the inventory module 206 via an API (e.g., an API provided by the API server 114) from the inventory database 208. In some embodiments, the inventory 206 may be accessed via an RSS feed or an upload of a spreadsheet. In some instances, a merchant may be able to edit, feature (i.e., showcase or highlight), or delete a product from the storefront. The inventory module 206 may provide default product settings changeable by the merchant for determining which products to feature on a home page of the storefront or for determining a course of action when one of the products sells out, when the quantity becomes too low, or if the product is not selling quickly.

A policy module 210 is configured to receive policies from the merchant that are enforced against the buyer. Examples of merchant policies may include pricing policies, dynamic pricing policies, shipping policies, payment policies, return policies, and the like. One example of an interface published by the policy module 210 directed to shipping policies is provided in FIG. 8. At least a portion of the policies may be received from the merchant in an "if-then" rule format.

A platform module 212 is configured to generate one or more executable applications based on the information provided by the merchant via the above described interfaces. The platform module 212 may generate source code, that when compiled, is executable within a particular mobile operating system. The source code includes human-readable program statements written in a high-level language that is not directly readable by a computer. When the source code is compiled into object code based on a selection of a platform or mobile operating system. Examples of platforms operating as mobile operating systems include iOS, Android, Windows Mobile, Blackberry, Palm, and the like. Other source code executable by more than one operating system, such as HTML code, may also be generated.

To generate the code, the platform module 212 may access one or more stored templates stored in a database such as templates database 214. The templates may include source code used to implement portions of the storefront. The templates may be separately generated for each platform. The source code within the templates is modifiable by the platform module 212. The platform module 212 may assemble and modify one or more of the stored templates to implement the storefront across multiple platforms as specified by the merchant. The template may be modified to include the merchant's selections. Based on the template selected by the platform module 212, the platform module 212 generates the source code of the application by mapping elements in the templates to modules of source code. For example, the inventory module may exist in the source code, fill in with the necessary inventory, and then be published to the merchant.

Figure 3:
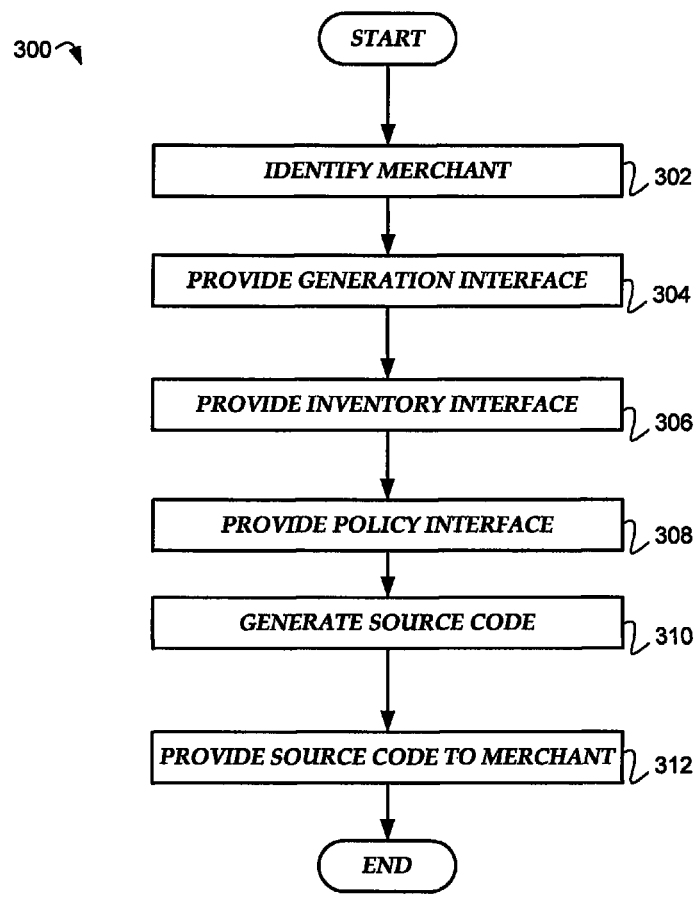
FIG. 3 is a flowchart of an example method of generating a mobile storefront according to various embodiments.

FIG. 3 is a flowchart of an example method 300 of generating a mobile storefront according to various embodiments. The method 300 may be performed by the generation system 200. In some instances, the method 300 may be performed by one or more processors within a cloud computing environment. The method 300 includes steps for providing one or more interfaces to the merchant, which the merchant can use to establish and maintain their mobile storefront. As used herein, a step of providing an interface may further comprise receiving input from the merchant via the interface and storing or processing the received input. As will be apparent, the steps of method 300 may be performed in various orders and are not limited to the order depicted in FIG. 3.

In a step 302, the merchant is identified from among a plurality of merchants by, for example, the initialization module 202. Step 302 may further comprise receiving a selection of a storefront from among a plurality of storefronts already created by the merchant. For example, the merchant may provide a login mechanism which identifies the merchant or storefront to the system. In some instances, a merchant may request creation of a new storefront in the step 302. Alternatively, the merchant may change a status of, or edit, an existing storefront to "open" or "closed." One example interface for creating or modifying the storefront is shown in FIG. 4.

In a step 304, a generation interface is provided to the merchant by the storefront module 204. The generation interface allows the merchant to select the appearance of the storefront using, for example, the generation interface of FIG. 5. If the storefront is being created by the merchant, a graphical theme may be selected. If the storefront is being modified, the graphical theme may be modified by the merchant using the generation interface or a new graphical theme may be selected for the storefront. The merchant may provide or select one or more customizations to customize the graphical theme. A customization may include a background color, an accent or complementary color, a text color, font, a text style or size, or a background image.

In a step 306, an inventory interface (see, e.g., FIG. 6) is provided to the merchant by the inventory module 206. The inventory interface may be configured to receive inventory information describing items for sale from the merchant. In some instances, the inventory may be accessed from a database maintained by the merchant, such as inventory 208 or another inventory database separate from the generations system 200. The inventory may be accessed via an API command, RSS feed, uploaded spreadsheet, or may be added item by item by the merchant (see, e.g., FIG. 7). In instances where the merchant has more than one storefront, the inventory is associated with the storefront selected in step 302.

The inventory interface may further allow the merchant to provide one or more inventory settings. The inventory setting may include products that should be shown on an initial interface provided to the user when the application is first executed by the user (e.g., a "home screen"). The inventory setting may also comprise an action to perform if a particular item sells out, the quantity available becomes too low or if there is a surplus of the item.

In a step 308, a policy interface is provided to the merchant by the policy module 210. The policy interface allows the merchant to establish storefront policies. Examples of storefront policies include pricing policies, dynamic pricing policies, shipping policies, payment policies, return policies, and the like. An example of a policy interface targeted to shipping policies is provided in FIG. 8.

In a step 310, the source code is generated by the platform module 212. The source code, when executed on a user device, displays the storefront to the user and allows a user to bid on or purchase one or more items for sale using the user device. The source code is generated according to the input received from the merchant via the interfaces provided in steps 304, 306, and 308. The source code may be generated using one or more templates. More than one set of source code may be generated for the storefront. The sets of source code may be generated for various platforms of user devices.

In some instances, not all of the steps 304, 306, and 308 may be required. In those instances, pre-saved settings or default settings may be used to generate the source code.

In a step 312, the source code is provided to the merchant. The source code is editable by the merchant. After the source code is given to the merchant, the merchant may customize the source code to meet his needs or add add-ons (such as a tax-calculator service). The merchant may further compile the source code into an executable application and publish the executable application to one or more users. An executable application may be provided by the generation system 200 to the merchant.

FIG. 4 is an example interface 400 for initiating generation of a mobile storefront according to an example embodiment. The interface 400 includes a preview screen 402 that provides a preview of an interface within the proposed storefront that will be displayed to a user. The preview screen 402 may further include an option to choose a preview of an interface as viewed by a potential buyer according to a platform of the user device. The interface 400 also comprises an initialization interface 404. The initialization interface 404 includes an input field (reference #) for a storefront title and a storefront logo. The merchant may also specify a currency associated with the storefront and a storefront status using the interface 400. The merchant may even add a message displayed to users if the storefront status is set to "closed." For example, the merchant may indicate that the store is closed for the holidays and specify the dates of closure. In some instances, the merchant may specify the behavior of having a closed store. For example, a closed store may accept payments and ship items, may not accept payments, may accept payments but delay shipping, or require extra payment to expedite an order while closed.

FIG. 5 is an example generation interface 500 for selecting the appearance of a mobile storefront according to an example embodiment. The generation interface 500 includes a preview screen 502 with an option to select a platform. The generation interface 500 also includes a generation interface 504. The generation interface 504 includes one or more selectable graphical themes and one or more options to customize the appearance and colors of the storefront. For example, one theme may have a particular format that allows display of an image, product name, title, description, and price. Another example of a theme may allow for a main image and thumbnails for further images. The merchant may scroll through the predefined themes to select a theme. The customizations may be used to generate a new graphical theme or to modify an existing graphical theme.

FIG. 6 is an example interface 600 for providing products to a mobile storefront according to an example embodiment. The interface 600 includes a preview screen 602 with an option to select a platform. The preview screen 602 includes a product list as opposed to showcasing one product at a time. The user may select a product from the product list to view additional information about the product. The user may purchase the item directly from the product list.

The interface 600 also includes an inventory interface 604. The inventory interface 604 allows the merchant to provide a description of the items for sale by the merchant. The descriptions of the items in the inventory interface 604 may include a title, a price, and a quantity available. The inventory interface 604 includes an option to edit, feature, or delete an item from the inventory. The inventory interface 604 further includes options for the merchant to set an item to be featured on the home screen of the application by selecting the star icon and to set an action to take if an item sells out.

Figure 7:
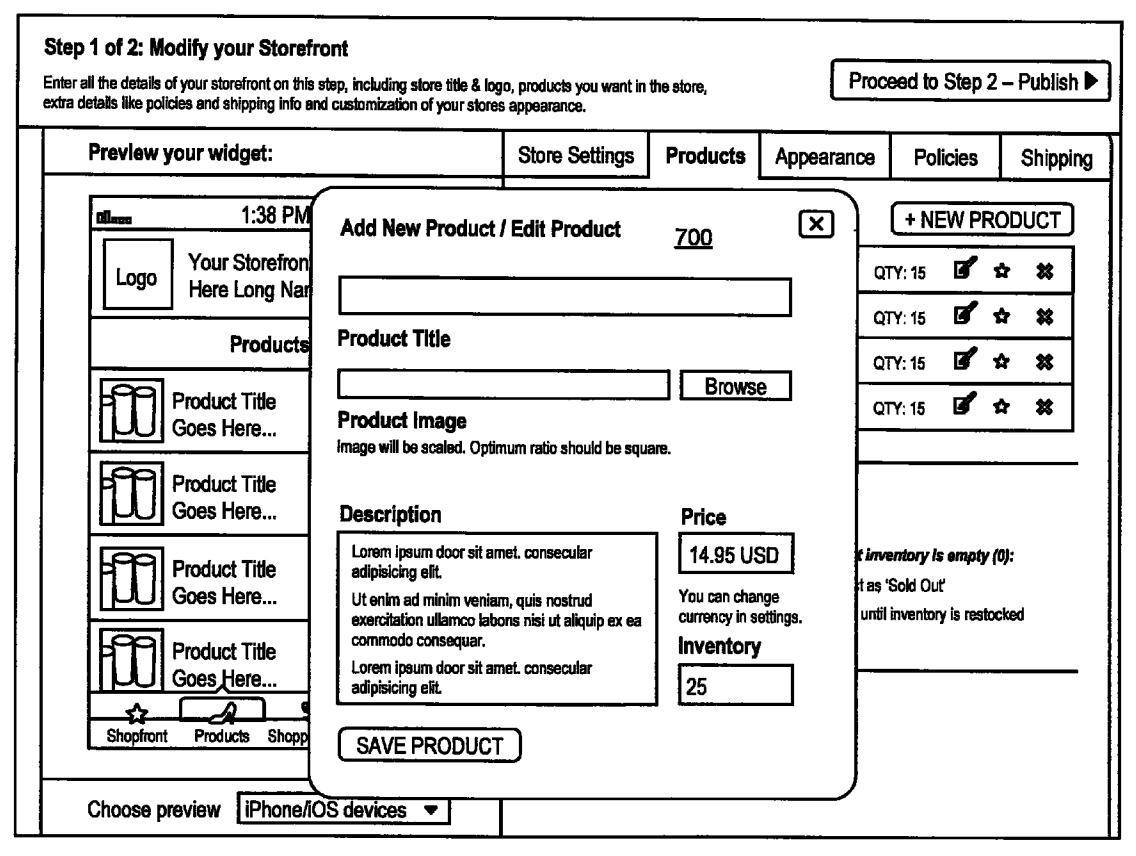

FIG. 7 is an example interface 700 for adding a product to a mobile storefront according to an example embodiment. The interface 700 may be initiated when the merchant selects the button labeled "+new product" on the interface. A pop-up screen (interface 700) may be provided for the manual input. The interface 700 includes an option to add a product title, import an image of the product, add a description of the product, provide a price of the product, and provide a quantity (labeled "inventory") of items available for sale. Once the product is saved it appears in the preview screen 602 or the interface 600.

Figure 8:
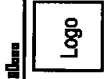
FIG. 8 is an example interface for providing shipping rules to a mobile storefront according to an example embodiment.

FIG. 8 is an example interface 800 for providing shipping policies to a mobile storefront according to an example embodiment. Additional interfaces may be provided for receiving other policies from the merchant. The interface 800 includes a preview screen 802 with an option to select a platform. The interface 800 further comprises a shipping interface 804. The shipping interface 804 allows a merchant to add, modify, or delete a shipping policy.

FIG. 9 is an example interface 900 for publishing a mobile storefront according to an example embodiment. The interface 900 includes options for a merchant to specify one or more platforms (including HTML) to publish the storefront. For example, the interface 900 provides default platforms (e.g., iPhone, Android, HTML) from which the merchant may select. Alternatively, the merchant may be allowed to indicate a different platform. In the case of a HTML platform, a code or flash object may be generated and provided to the merchant. The merchant can then copy the code to their website or otherwise publish the code to potential buyers.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 10:
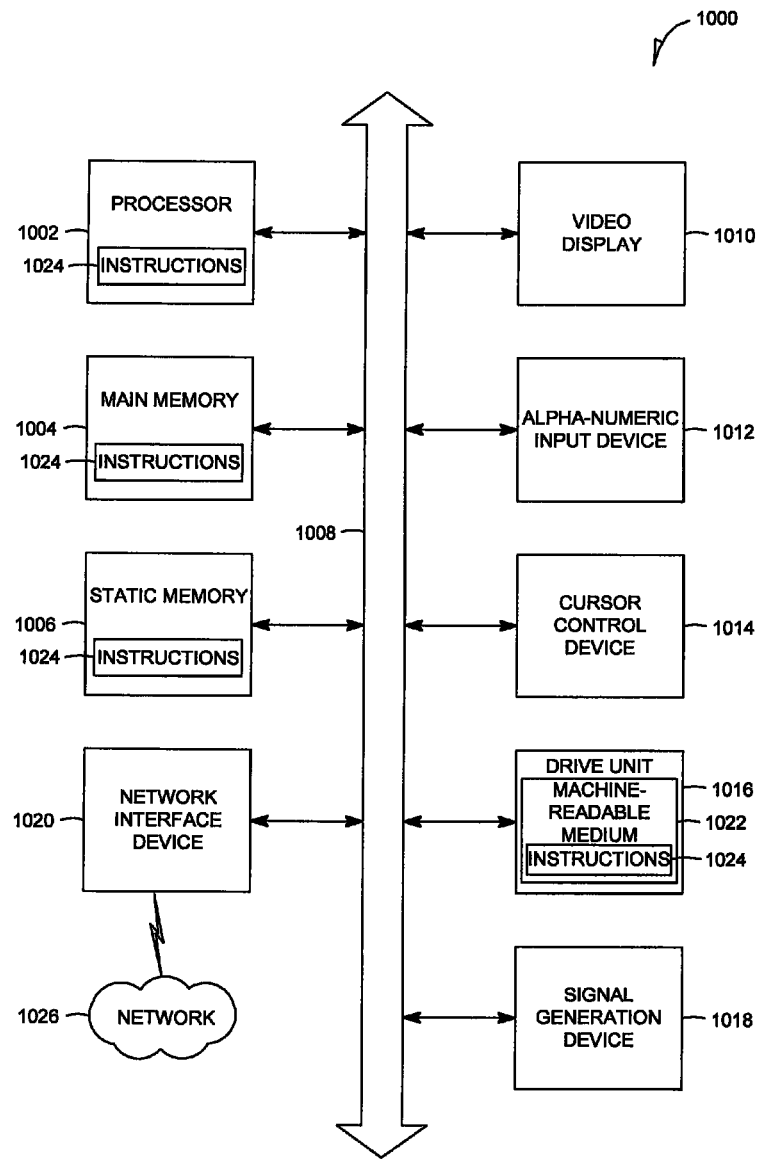
FIG. 10 is a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media. The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that storefront the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Thus, a method and system to generate a storefront have been described. Although the present invention has been described with reference to specific example embodiments, it will be evident that various modifications and changes may be made to these embodiments without departing from the broader spirit and scope of the invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:

an initialization module configured to provide, via one or more web servers, an initialization interface to an identified merchant, the initialization interface configured to receive an indication from the identified merchant to initialize creation of a storefront application, the storefront application being executable by a user device to allow a user of the user device to purchase an item;

an inventory module configured to receive, via the one or more web servers, inventory information describing items for sale from the identified merchant;

a platform module that includes one or more hardware processors and is configured to:

receive, from the identified merchant, a selection of one or more of a plurality of mobile phone device operating systems;

access one or more stored templates from a template database, the stored templates corresponding to the selected mobile phone device operating systems, each of the stored templates including source code that is used to implement portions of the storefront application on at least one of the plurality of mobile phone device operating systems;

map elements in the accessed stored templates to portions of source code to generate one or more sets of operating system-specific source code that when compiled become versions of the storefront application that are executable by a respective one of the plurality of mobile phone device operating systems; and further map at least a portion of the received inventory information to each of the sets of operating system-specific source code; and a storefront module configured to provide, via the one or more web servers, a generation interface, the generation interface configured to:

display a preview version of the storefront application on a display of at least one of a plurality of mobile phone systems, the preview version corresponding with a respective mobile phone device operating system, and receive a modification from the identified merchant to the preview version of the storefront application, wherein the platform module is further configured to modify each of the one or more respective stored templates specific to each mobile phone device operating system in accordance with the modification.

2. The system of claim 1, further comprising a policy module configured to provide a policy interface and to receive, from the identified merchant, policies of the storefront application.

3. The system of claim 1, wherein the generation interface is further configured to receive, from the merchant, an indication of an appearance of the storefront application.

4. The system of claim 1, wherein the inventory module is configured to receiving an inventory setting from the merchant, the inventory setting comprising an action to perform if a particular item sells.

5. The system of claim 3, wherein the indication of the appearance of the storefront application is a selection of at least one of a background color, an accent color, a text color, a font, a text size, a text style, or a background image.

6. The system of claim 1, wherein the initialization module is further configured to receive an indication of a storefront status.

7. The system of claim 6, wherein the initialization module is further configured to receive a message to display to the user if the storefront status is closed.

8. The system of claim 1, wherein the inventory module is configured to access an inventory database via an application programming interface and obtain the inventory information from the inventory database.

9. The system of claim 1, wherein the plurality of templates include a first template with a first setting for a first one of the plurality of mobile phone device operating systems and a second template with a second setting for a second one of the plurality of mobile phone device operating systems.

10. A method comprising:
providing, by one or more processors, an initialization interface to an identified merchant, the initialization interface configured to receive an indication from the identified merchant to initialize creation of a storefront application, the storefront application being executable by a user device to allow a user of the user device to purchase an item;
receiving, by the one or more processors, inventory information describing items for sale from the identified merchant;
receiving, by the one or more processors, a selection of one or more of a plurality of mobile phone device operating systems from the identified merchant;
accessing, by the one or more processors, one or more stored templates from a template database, the stored templates corresponding to the selected mobile phone device operating systems, each of the stored templates including source code that is used to implement portions of the storefront application on at least one of the plurality of mobile phone device operating systems;
mapping, by the one or more processors, elements in the accessed stored templates to portions of source code;
further mapping, by the one or more processors, at least a portion of the received inventory information; and
generating, by the one or more processors, one or more sets of operating system-specific source code that include mapped elements of the stored templates and mapped inventory information, the sets of operating system-specific source code configured such that when compiled become versions of the storefront application that are executable by a respective one of the plurality of mobile phone device operating systems;
displaying, by the one or more processors, a preview version of the storefront application in a generation interface that is displayed on a display of at least one of a plurality of mobile phone systems that corresponds with a respective mobile phone device operating system;
receiving, by the one or more processors, a modification to the preview version of the storefront application; and
modifying, by the one or more processors, each of the one or more respective stored templates specific to each mobile phone device operating system in accordance with the modification.

11. The method of claim 10, further comprising providing a policy interface, the policy interface to receive, from the merchant, policies of the storefront.

12. The method of claim 10, further comprising providing, in the generation interface, an indication of an appearance of the storefront application received from the merchant.

13. The method of claim 12, wherein the indication of the appearance of the storefront application is a selection of a graphical theme.

14. The method of claim 12, wherein the indication of the appearance of the storefront application is a selection of at least one of a background color, an accent color, a text color, a font, a text size, a text style, or a background image.

15. The method of claim 10, further comprising receiving an indication of a storefront status.

16. The method of claim 15, further comprising receiving a message to display to the user if the storefront status is closed.

17. The method of claim 10, wherein the receiving of the inventory information comprises accessing an inventory database via an application programming interface and obtaining the inventory information from the inventory database.

18. The method of claim 10, wherein the plurality of templates include a first template with a first graphical setting for a first one of the plurality of mobile phone device operating systems and a second template with a second graphical setting for a second one of the plurality of mobile phone device operating systems.

19. The method of claim 10, wherein the one or more sets of operating system-specific source code include a single set of source code for a single mobile phone device operating system.

20. A non-transitory computer-readable medium having instruction embodied thereon, the instructions executable by one or more processors to perform a method, the method comprising:
providing an initialization interface to an identified merchant, the initialization interface configured to receive an indication from the identified merchant to initialize creation of a storefront application, the storefront application being executable by a user device to allow a user of the user device to purchase an item;
receiving inventory information describing items for sale from the identified merchant;
receiving a selection of one or more of a plurality of mobile phone device operating systems from the identified merchant;
accessing one or more stored templates from a template database, the stored templates corresponding to the selected mobile phone device operating systems, each of the stored templates including source code that is used to implement portions of the storefront application on at least one of the plurality of mobile phone device operating systems;
mapping elements in the accessed stored templates to portions of source code;
further mapping at least a portion of the received inventory information; and
generating one or more sets of operating system-specific source code that include mapped elements of the stored templates and mapped inventory information, the sets of operating system-specific source code configured such that when compiled become versions of the storefront application that are executable by a respective one of the plurality of mobile phone device operating systems;
displaying a preview version of the storefront application in a generation interface that is displayed on a display of at least one of a plurality of mobile phone systems that corresponds with a respective mobile phone device operating system;

receiving a modification to the preview version of the storefront application; and modifying each of the one or more respective stored templates specific to each mobile phone device operating system in accordance with the modification.

\* \* \* \* \*